Patented Nov. 14, 1933

1,935,054

UNITED STATES PATENT OFFICE 1,935,054

CATALYTIC OXIDATION OF ORGANIC COMPOUNDS

Alphons O. Jaeger, Mount Lebanon, Pa., assignor to The Selden Company, Pittsburgh, Pa., a corporation of Delaware No Drawing. Application December 2, 1930.
Serial No. 499,535

16 Claims. (Cl. 260—57)

This invention relates to methods for effecting catalytic oxidations of organic compounds in the liquid or vapor phase.

In the past catalytic oxidations of organic compounds have been carried out by the use of catalysts such as the oxides or other compounds of vanadium, molybdenum, and the like, either alone or distributed upon carrier materials such as pumice. In my prior Patents No. 1,728,732 dated September 17, 1929, and No. 1,694,620 dated December 11, 1928, I have described contact masses for this purpose containing catalytic materials distributed upon or contained in base exchange compounds, either silicious or non-silicious, which compounds have contained various diluents such as kieselguhr and the like.

I have now found that many of the important advantages obtained by the use of catalysts containing base exchange compounds can also be obtained with great savings in the cost of catalyst production, by employing catalysts in which diatomite brick fragments have been directly impregnated with the desired catalytic material.

Diatomite brick, as it is termed in the trade, is a very light, hard, porous form of silica which occurs naturally in many parts of the world. The raw brick is obtained directly from the natural deposits and in the practice of vapor phase oxidations according to the present invention may be directly impregnated with catalytic material and used, the temperature conditions of most vapor phase organic reactions being such as to effect complete dehydration and burn out or volatilize most organic impurities. Such uncalcined fragments are, however, less well suited for many reactions than those which have been given a preliminary firing because they tend to shrink when first heated and because there is a tendency for the carbonaceous material and other impurities present to effect reduction or other changes in the catalyst. The use of precalcined fragments in the preparation of catalysts for the reactions of the present invention also presents other advantages as will be more fully explained in the following description.

Calcined diatomite brick may be prepared for the production of catalysts for the catalytic oxidation of organic compounds either as the calcined natural brick or as pressed brick, which is obtained by preparing a mixture with water, and with or without the addition of alkalies, alumina or other substances of the natural or artificial powdered earth or materials derived therefrom, such substances as diatomaceous earth, kieselguhr, "Celite" earth a diatomaceous earth mined in California being suitable as well as treated materials. This mixture is formed in a mold or press, dried, and fired at temperatures of 700–1200° C., the firing temperature depending on the particular components of the mixture. As is well known, the firing temperature has a marked influence on the physical properties of the brick, too high a temperature (above 1,000° C.) developing a tendency to convert a part of the silica into crystobalite which is objectionable where brick fragments of good mechanical strength are desired. It is possible, however, to fire at the higher temperatures with the production of tridymite, which exhibits much more favorable physical characteristics if 1–3% of lime is incorporated into the diatomite powder with or without binders such as kaolin, feldspar and the like.

Such pressed and fired diatomite brick has properties for the preparation of catalysts much superior to those of the original diatomaceous earth, since the edges of the particles have been partially fused together while at the same time the burning out of carbonaceous impurities greatly enlarges the natural pores. The extremely high capillarity of these pores, together with the innumerable silicious surfaces that reflect radiant energy, the low density of the product and the evident discontinuity of the particles produces a substance that is excellently suited for the preparation of catalysts for organic oxidations.

The catalysts to be used in effecting the catalytic oxidations of organic compounds according to the present invention are prepared by impregnating or coating the raw or calcined brick fragments with catalytically active material. This impregnation or coating may be effected, for example, by soaking the bricks in solutions of catalytic material, followed by drying or chemical precipitation within the pores by treatment with gases and the like. Other methods of preparation such as simultaneous or successive impregnation with reacting vapors or solutions or, in the case of calcined brick, incorporation of a part of the reagents to be used into the brick particles before firing can also be used. Such reagents which may be incorporated before firing may include the oxides or other difficultly fusible compounds of such metals as aluminum, copper, silver, iron, cobalt, nickel, thorium, zirconium, titanium, and the like, which may be mixed with the finely divided diatomaceous earth before it is pressed into brick form or may be impregnated into the natural brick from solution or suspension. It is, of course, understood that after firing of the brick containing these substances, either singly or in admixture, the desired catalyst may be prepared by effecting further impregnation within the pores of the remaining portion of the components of the catalyst to be prepared. In many cases, after formation of the catalyst is completed it is desirable to wash out soluble salts and other products of the reaction which can be done by continued soaking of the prepared brick in suitable solutions. Coating of the brick particles may be effected in the usual manner by spraying the heated fragments with solutions or suspensions of the desired catalytic material. The preparation of catalysts in this manner is not to be confused with prior processes wherein kieselguhr and other diatomaceous carriers have been impregnated with preformed catalysts and then artificially pressed into catalyst pellets with or without suitable binders, as the favorable porous structure and physical resistance that is the characteristic of the diatomite brick is not obtained except in the natural brick or in brick that has been prepared by firing far above any temperatures that such preformed catalysts will stand. Catalysts are dependent as much on their physical condition as on chemical constitution, and even if the preformed material were not destroyed by the high temperatures necessary in firing, its physical condition would be so altered that it would be practically useless for catalytic purposes.

The present invention in its broadest aspects is not limited to any particular class of organic oxidations as the physical and chemical characteristics of catalysts prepared by the impregnation of diatomite brick are such that they may be used for the oxidation of organic compounds of any type. Such reactions as the oxidation of hydrocarbons, alcohols, aldehydes, acids, ketones and the like to intermediate oxidation products may be effected; for example the oxidation of benzols, toluols, phenols, tar phenols, furfural and compounds containing the group—$CH_2—CH=CH—CH_2$—to maleic and fumaric acids; naphthalene to phthalic anhydride, benzoic acid and maleic acid; anthracene to anthraquinone; phenanthrene to phthalic and maleic anhydrides; acenaphthene to naphthalic anhydride and other intermediate oxidation products; mono- and polyhydric alcohols to aldehydes, ketones and acids, such as the oxidation of methyl alcohol to formaldehyde, ethyl alcohol to acetic acid, ethylene chlorhydrine to chloracetic acid; of phenols such as cresol to salicylaldehyde and salicylic acids, and of acids such as phthalic anhydride and the like to maleic and fumaric acids. The catalysts of the present invention can also be used for the selective oxidation of impurities, such as the catalytic purification of crude anthracene and crude phenanthrene, crude naphthalene, crude mononuclear hydrocarbons and coal tar ammonia.

The invention is not limited to the use of any particular catalytically active elements but on the contrary any desired catalyst or mixture of catalysts may be used, the choice depending on the particular oxidation to be effected. In organic oxidations, the oxides or salts of vanadium, molybdenum, chromium, tungsten, or any of the other metals of the fifth,سسسسسسsixth, seventh or eight groups of the periodic system may be used, either singly or in combination, and it is an advantage of the present invention that the diatomaceous brick particles, being uniformly resistant to high temperatures can be used at any range of reaction temperatures.

In many organic oxidations it is desirable to obtain a slowing up or smoothing out of the catalytic effect and for such purposes I have previously suggested the use of stabilizers, that is to say compounds of the alkali metals, alkaline earth metals and earth metals whose oxides are difficultly reducible by hydrogen. I have also previously proposed the use of stabilizer promoters, or non-specific catalysts in conjunction with such stabilizers. In conjunction with diatomite brick that has been subjected to preliminary calcination such stabilizers and stabilizer promoters are particularly useful, as they function both in the preparation and use of the catalyst. Many diatomaceous substances, both those occurring as natural rock and those obtained in granular form contain substances such as clay, lime, magnesia, iron oxide, potash, titania, and the like. In firing such brick the incorporation of alkali or alkaline earth metal substances or of alumina, iron oxide, titania, chromic oxide and other substances having a stabilizer promoter action tends to form with these a flux which not only permits firing at a much lower temperature with a corresponding increase in overall strength of the brick but also insures a uniform distribution of these substances throughout the whole mass. When, after firing, the brick is impregnated, these stabilizers and stabilizer promoters are brought into unusually intimate contact with the catalytic material and frequently react with it to form additional compounds, particularly after the prepared catalyst has been put into use. It is of course possible to impregnate or mix other substances into the bricks before firing which are not stabilizers or stabilizer promoters for the reaction under consideration, but which tend to produce secondary reactions in the catalyst or which add desirable properties to the brick, e. g. sand, powdered glass, etc., and the invention is not limited to the preliminary impregnation of any particular class of substances. The action of the stabilizers and stabilizer promoter elements, once the catalyst is put into use, is similar to their action in catalysts obtained by other methods.

In preparing highly active catalysts it is sometimes desirable to increase the porosity of the brick. This may be done, in the case of pressed brick, by incorporating during the mixing and pressing stages substances which will be decomposed when the brick is fired, such substances as cork, sugar, molasses, or other organic compound being particularly suitable. As has already been stated, diatomaceous substances ordinarily contain organic material in amounts up to 6–8%, and the combustion and volatization of this material upon firing is ordinarily sufficient to produce satisfactory bricks for use in preparing catalysts. The addition of further decomposable material, however, may be desirable in the preparation of particularly porous carriers and is included in the present invention.

The invention will be further illustrated by the following specific examples, which are for illustrative purposes only and to which it is not limited.

*Example 1*

Ammonium vanadate dissolved in water is impregnated into calcined natural diatomaceous brick, the majority of the water evaporated off and the brick is subjected to treatment with a dilute solution of silver nitrate in order to form a precipitate of silver vanadate within the pores, the ratio of the precipitate to the brick used being 1:4–6 parts by weight. The brick is then dried at temperatures up to 100° C., broken into pieces and can be used for the vapor phase catalytic oxidation of organic compounds. For example, this catalyst is well suited for the oxidation of methyl alcohol to formaldehyde, benzol, toluol, phenol, tar acids or phthalic anhydride to maleic acid, the vapors of the compounds mixed with air in the proportion of about 1:25 by weight and being passed over the contact mass at a temperature of 360–420° C.

If it is desired to stabilize the contact mass, this may be done by using artificial brick made by mixing up kieselguhr or diatomaceous earth with 3–5% of its weight of sodium or potassium carbonate before firing, after which the brick is impregnated with catalyst in the manner described. The stabilizer can also be incorporated by carefully soaking the impregnated brick in saturated solutions of sodium, potassium or other alkali or alkaline earth metal compound, which is preferably done before the silver vanadate precipitate has formed. Such stabilized contact masses are well suited for the oxidation of anthracene to anthraquinone or acenaphthene and acenaphthylene to naphthalic anhydride, the hydrocarbon vapors mixed with air in the proportion of 1:40 by weight being passed over the contact mass at 380–420° C.

*Example 2*

100 parts of natural or artificial diatomite brick preferably that containing considerable proportions of alumina such as is found near Richmond, Virginia, are calcined at the usual temperatures and impregnated with a solution of 10–15 parts of potassium vanadate in water, followed by drying. The brick is broken into fragments and calcined in the presence of air and acid gases such as chlorine, $SO_2$ and the like, after which the contact mass is well suited for the oxidation of toluols and substituted toluols, xylols, pseudocumene, mesitylene, paracymene and other substitution products to the corresponding aldehydes and acids at temperatures of 350–420° C. in the presence of air or oxygen, with or without the use of larger quantities of diluting gas, for example in a circulatory process.

*Example 3*

100 parts of natural, uncalcined diatomite brick fragments are impregnated with a suspension containing 10 parts of ferric pyrovanadate, followed by firing at 800–1,000° C. in the usual manner. The fired brick is then treated with a solution containing 20 parts of potassium vanadomolybdate together with a small excess of KOH, after which it is dried, broken into pieces, calcined at 400° C. and then subjected to a subsequent treatment with $SO_2$ containing gases at 400–500° C. until all the alkali is transformed into the sulfate or bisulfate. The contact mass is then blown with air until acid gases no longer escape and is then suited as a contact mass for the catalytic oxidation of fluorene to fluorenone, acenaphthene to naphthalic anhydride, and anthracene to anthraquinone. For example, 90% fluorene is uniformly vaporized into an air stream in the ratio of 1:25 and passed over the contact mass at 360–400° C., the reaction mixture being preferably admixed with a substantial portion of steam to produce best results. A fluorene of high purity is obtained.

*Example 4*

80 parts of natural diatomite brick fragments are uniformly and homogeneously impregnated with 9 parts of a concentrated ammonium vanadate solution and dried at temperatures of 80–100° C.

A contact mass is thus obtained which is well suited for the catalytic oxidation of many organic compounds, particularly naphthalene to phthalic anhydride when vapors of the former mixed with air in the proportion of 1:25–30 are passed over the contact mass at temperatures from 370 to 400° C. If the brick fragments are first impregnated with $K_2CO_3$ and then with the ammonium vanadate and the drying is followed by treatment with hot $SO_2$ gases, large amounts of alphanaphthaquinone may be obtained when a naphthalene-air ratio of 1:45 is used.

*Example 5*

58 parts $Cu(NO_3)_2.3H_2O$ are dissolved in 300 parts of water. The solution is taken up by absorption in 200 parts by weight of natural diatomaceous brick which has been broken into fragments the size of a pea. The brick fragments are partially dried to remove excess water and are then treated with a concentrated solution of 40 parts of ammonium vanadate in water, the treatment being effected by permitting the solution to trickle over the brick fragments so that a uniform impregnation is obtained. The product so obtained is dried and is an excellent catalyst for the oxidation of naphthalene to phthalic anhydride, benzoic acid and maleic acid when naphthalene-air mixtures in the ratio of 1:25–30 is passed over it at temperatures from 370–420° C.

When a stabilized catalyst is desired, diatomite containing approximately 4% alumina, such as that obtained from the Lompoc deposits in California is especially suitable, since the alumina acts as a stabilizer promoter. Such brick may be treated with 15% solutions of sodium carbonate, dried, and fired at high temperature, after which impregnation with the catalytic material is effected as described.

*Example 6*

30 parts of $Cu(NO_3)_2.3H_2O$ and 60 parts $Fe(NO_3)_3.9H_2O$ are dissolved in water and 200 parts of finely divided diatomite material such as kieselguhr, "Celite" earth and the like are stirred in. 5–8 parts of China clay or kaolin are added and the mixture is evaporated with stirring until a thick paste is obtained which is compressed into bricks and fired at temperatures up to 1100° C. After firing the brick is broken into fragments and treated with a solution of ammonium vanadate, an excess of which is trickled over the brick fragments until no more precipitation occurs. The brick may be washed to remove soluble impurities, is then dried and placed in a converter and mixtures of crude coal tar ammonia with air in the ratio of 1:5–10 are passed over it at 300–450° C., whereby organic impurities and sulfur compounds are oxidized with but little oxidation of the ammonia itself. The purified ammonia gases so produced are excellently suited for oxidation to oxides of nitrogen in the presence of such catalysts as platinum, oxides of iron and the like.

Example 7

70 parts of Co(NO₃)₂.6H₂O are dissolved in 200 parts of water and precipitated with 10 normal KOH solution, filtered, and suspended in 250 parts of water to which 8 parts of 100% KOH have been added.

200 parts of fired diatomite brick are broken into fragments the size of a pea and heated. The cobalt oxide suspension is coated onto the hot fragments, the heating being continued in such a manner as to effect uniform evaporation of the water and thus produce a uniform coating. Under some conditions it is an advantage to use a more dilute suspension, for example 400 parts of water instead of 250, and to effect spraying under some pressure. This effects impregnation of the catalytic material for a considerable distance into the pores of the diatomite brick fragments. The same effect can of course be produced by trickling the suspension onto the cold brick fragments and removal of water by heating, but in this case the coating is not so uniform.

After drying, the catalyst so obtained is filled into a converter supplied with good temperature control, preferably one in which the catalyst tubes are surrounded by an alloy bath, and vapors of crude anthracene mixed with air in the ratio of 1:30 are passed over it at temperatures of 360–420° C. When catalyst temperatures of 380° are used, a product is obtained containing 73.34% anthracene, 0.96% carbazole and no anthraquinone, the input in this case having been of a crude material analyzing 30% anthracene and 23% carbazole. An anthracene of 95.66% purity was obtained from a converter product after one recrystallization from a phenanthrene solvent such as furfural, pyridine, etc.

Example 8

Diatomaceous earth such as that found in Florida is heated to burn out the carbonaceous matter, the siliceous material remaining as a very fine powder consisting of practically 100% silica. This substance is made into a paste with water, pressed into bricks and fired at temperatures of 900–1,000° C., a light firm and porous product resulting. If increased porosity is desired, this may be obtained by incorporating small amounts of molasses, cane syrup or other carbohydrates with the powdered diatomaceous earth before firing, such substances being decomposed and thus tending to increase the size of the pores.

The brick so obtained is treated with a solution prepared by dissolving 14 parts V₂O₅ and 13 parts 100% KOH in water. After a uniform impregnation has been completed, the brick is partially dried and is then subjected to the action of a diluted solution of potassium silicate until a second impregnation has been effected. After drying the brick is subjected to the action of SO₂ gases at 350° C. and is then useful for catalytic organic oxidations. Alcohols such as methyl alcohol, ethyl alcohol, etc., in admixture with air in the proportion of 1:20 may be passed over it at temperatures of 360–420° C. with excellent yields of the corresponding oxidation products such as formaldehyde, acetic acid, etc. In the same manner cyclic compounds such as phenols, benzols, tar acids, and furfural may be oxidized to maleic, fumaric and tartaric acids at temperatures of 380–450° C.

What is claimed as new is:

1. A method of oxidizing organic compounds, which comprises subjecting them to reaction with an oxidizing agent in the presence of a catalyst containing a compound of a metal included in the 5th and 6th groups of the periodic system which contains diatomaceous brick fragments as a support.

2. A process according to claim 1 in which the catalyst contains a compound of vanadium.

3. A method of oxidizing organic compounds, which comprises passing the vapors of the compounds mixed with an oxidizing gas at reaction temperatures over a catalyst containing a compound of a metal included in the 5th and 6th groups of the periodic system which contains diatomaceous brick fragments as a support.

4. A process according to claim 3 in which the catalyst contains a compound of vanadium.

5. A method of oxidizing organic compounds which comprises passing the vapors of the compounds mixed with an oxidizing gas at reaction temperatures over a contact mass comprising fired diatomaceous brick fragments, the contact mass containing at least one compound of a metal included in the 5th and 6th groups of the periodic system at least one component of a catalyst having been associated with the brick before firing and at least one component associated therewith after firing.

6. A method of oxidizing organic compounds, which comprises passing the vapors of the compounds mixed with an oxidizing gas at reaction temperature over a contact mass comprising diatomite brick containing a catalyst, at least one component of the catalyst being a compound of a metal occurring in the natural deposit from which the brick fragments were made.

7. A method of oxidizing organic compounds, which comprises passing the vapors of the compounds mixed with an oxidizing gas at reaction temperatures over a catalyst which has been prepared by mixing diatomaceous earth containing metallic impurities which tend to raise its fusing point with a compound of an alkali forming metal which will produce a flux, moistening the material and forming bricks thereof, firing the bricks at temperatures suitable to produce a monogeneous bond, breaking the fired brick into fragments, associating the fragments with catalytically active material containing a compound of a metal included in the 5th and 6th groups of the periodic system, and drying if necessary.

8. A process according to claim 7 in which the catalyst contains a compound of vanadium.

9. A method of purifying mixtures of organic compounds, which comprises subjecting them to selective oxidation in the presence of a catalyst containing at least one compound of a metal included in the 5th, 6th and 8th groups of the periodic system which contains diatomaceous brick fragments as a support.

10. A method according to claim 9 in which the organic compound is crude anthracene.

11. A method of oxidizing naphthalene to phthalic anhydride, benzoic acid, and maleic acid which comprises passing naphthalene vapors in admixtures with air at reaction temperatures over a catalyst containing at least one compound of a metal included in the 5th and 6th groups of the periodic system which contains diatomaceous brick fragments as a support.

12. A process according to claim 11 in which the catalyst contains a compound of vanadium.

13. A method of oxidizing naphthalene to phthalic anhydride which comprises passing naphthalene vapors in admixture with air at reaction temperatures over a catalyst prepared by impregnating diatomaceous brick fragments with a compound of vanadium.

14. A method of oxidizing naphthalene to phthalic anhydride which comprises passing naphthalene vapors in admixture with air at reaction temperatures over a catalyst comprising calcined diatomite brick impregnated with copper vanadyl vanadate.

15. A method of oxidizing organic compounds which comprises passing the vapors of the compounds mixed with an oxidizing gas at reaction temperatures, over a catalyst favoring the oxidation of organic compounds which contains fired diatomaceous brick fragments as a support and which catalyst also contains at least one compound of a metal selected from the group consisting of alkali metals and alkaline earth metals.

16. A process according to claim 15 in which the catalyst also contains a stabilizer promoter.

ALPHONS O. JAEGER.